UNITED STATES PATENT OFFICE.

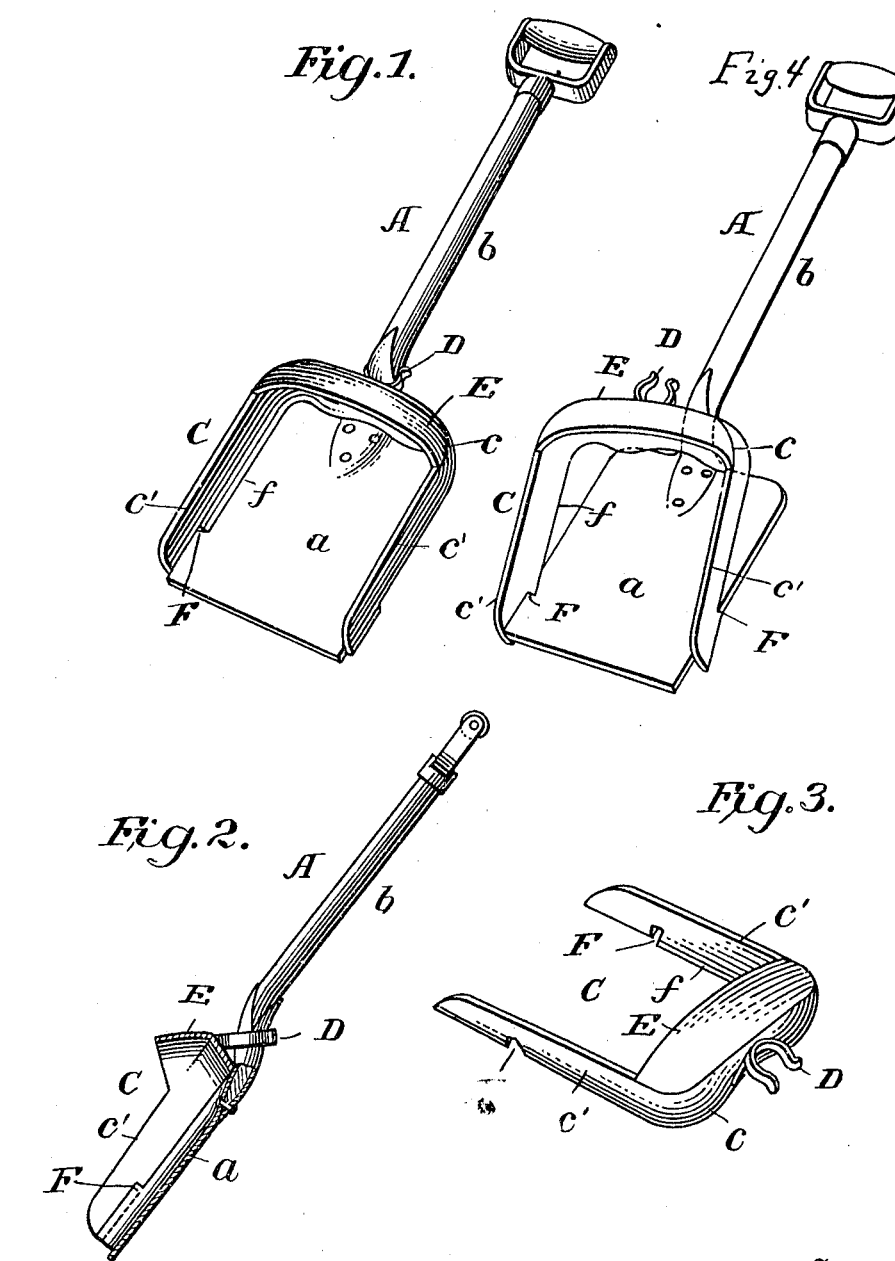

ANTHONY F. HAMMERSCHMIDT, OF GRAND RAPIDS, MICHIGAN.

COMBINED SHOVEL AND SCOOP.

956,961.     Specification of Letters Patent.     Patented May 3, 1910.

Application filed September 13, 1909. Serial No. 517,403.

*To all whom it may concern:*

Be it known that I, ANTHONY F. HAMMERSCHMIDT, a citizen of the United States, residing in Grand Rapids, in the county of Kent and State of Michigan, have invented a Combined Shovel and Scoop, of which the following is a specification.

The object of my invention is to provide an implement which can be used either as a shovel or as a scoop.

The shovel is of ordinary construction but it is provided with an attachment which converts it into a scoop. This attachment can be readily placed on the shovel and removed when desired, but when in position it connects with the shovel so firmly that the latter becomes a scoop and can be used as such for all purposes where scoops are ordinarily employed.

In the accompanying drawings, Figure 1 is a perspective view of my combined shovel and scoop. Fig. 2 is a view partly in side elevation and partly in section of the same. Fig. 3 is a perspective view of the attachment. Fig. 4 is a perspective view with the parts partially separated.

The shovel A is of usual construction comprising the blade $a$ and the handle $b$.

C represents the attachment for converting the shovel into a scoop. This is made of sheet metal and is preferably formed as shown with a back piece $c$ and two side pieces $c'$. The lower edge of the back piece is shaped to fit the upper side of the blade near its rear edge, and at the rear the back piece carries a spring clip D adapted to engage the shovel handle. Each side piece $c'$ forms a continuation of the back piece and extends to the front of the blade and terminates at the front edge thereof. A top piece E extends forwardly from the upper edge of the back piece for a short distance, its opposite ends terminating over the rear portions of the side pieces. Near their front ends each side piece is formed with a notch F adapted to receive the side edge of the shovel. That part $f$ of the lower portion of each side piece in rear of the slot lies above the shovel blade, as shown in Fig. 1, and that part in front of the slot lies below the blade. In this way an interlocking connection is made between the attachment and the shovel blade and when the clip D engages the handle, the attachment is firmly held in place. The joints are made smooth and even and the scoop can be used in the usual way.

When placing the attachment on the shovel, the rear part of the attachment is raised and the front portions of the sides are placed on opposite sides of the blade causing the parts in front of the slots F to lie below the blade and the parts $f$ in rear of the slots to lie above the blade. Then the attachment is moved forward and the rear end is lowered until the clip D springs into engagement with the handle. The attachment may be removed by raising its rear portion until the clip D is disengaged and then moving it backward until the attachment slips off from the edges of the shovel blade.

I claim as my invention:—

1. The combination with a shovel, of an attachment for converting it into a scoop comprising the back piece provided with means for attaching it to the shovel handle, and the notched side pieces adapted to engage the side edges of the blade.

2. The combination with a shovel, of an attachment for converting it into a scoop, comprising the back piece provided with a spring clip for attaching it to the shovel handle, the top piece and the side pieces having notched lower edges to engage the opposite side edges of the shovel blade, those lower portions of the sides in rear of the slots lying above the blade, while those portions in front of the slots lie below the blade.

In testimony whereof, I have hereunto subscribed my name.

ANTHONY F. HAMMERSCHMIDT.

Witnesses:
   G. F. HONEMAN,
   Mrs. G. HONEMAN.